United States Patent
LeBlanc et al.

(10) Patent No.: US 7,042,125 B2
(45) Date of Patent: May 9, 2006

(54) HYDRAULIC FLUID DYNAMIC BEARING INCORPORATING AN ASYMMETRIC JOURNAL BEARING

(75) Inventors: Jeffry Arnold LeBlanc, Aptos, CA (US); Alan Lyndon Grantz, Aptos, CA (US); Troy Michael Herndon, San Jose, CA (US); Michael David Kennedy, Boulder Creek, CA (US); Anthony Joseph Aiello, Aptos, CA (US); Robert Alan Notthingham, Santa Cruz, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 151 days.

(21) Appl. No.: 10/264,229

(22) Filed: Oct. 2, 2002

(65) Prior Publication Data
US 2003/0205942 A1    Nov. 6, 2003

Related U.S. Application Data

(60) Provisional application No. 60/377,329, filed on May 1, 2002.

(51) Int. Cl.
*H02K 5/16* (2006.01)
(52) U.S. Cl. ............... 310/90; 384/110; 360/99.08
(58) Field of Classification Search ............... 384/100, 384/107, 108, 110, 124, 130, 137; 310/90, 310/90.5; 360/99.08
See application file for complete search history.

(56) References Cited

U.S. PATENT DOCUMENTS 5,427,456 A  *  6/1995  Hensel ............... 384/112
5,559,651 A     9/1996  Grantz et al. ......... 360/99.08
5,697,708 A    12/1997  Leuthold et al. ....... 384/110

(Continued)

FOREIGN PATENT DOCUMENTS

WO    WO 98/48188    10/1998

OTHER PUBLICATIONS

International Search Report mailed Sep. 11, 2003, for PCT patent application No. PCT/US03/13330, filed Apr. 29, 2003: 4 pages.

*Primary Examiner*—Darren Schuberg
*Assistant Examiner*—Judson H. Jones
(74) *Attorney, Agent, or Firm*—Morrison & Foerster LLP

(57) ABSTRACT

A fluid bearing design is provided which according to one aspect includes a shaft defining together with a surrounding sleeve an asymmetric journal bearing, and a thrust bearing at or near an end of the shaft towards which the asymmetric journal bearing is pumping, with that end of the shaft being closed off. The journal bearing asymmetry establishes a hydraulic pressure toward the closed end of the shaft. This pressure provides an axial thrust to set the bearing gap for the conical bearing. The conical bearing itself is a relatively balanced bearing, although it may have a bias pumping toward the shaft and the journal bearing.

A pressure closed equalization path from the journal bearing through the conical bearing to the end of the shaft may be established to maintain a constant hydraulic force across the conical bearing, and which may also prevent any asymmetry in the conical bearing from affecting the net thrust force acting upon the end of the shaft where the conical bearing is located. Alternatively, in a fluid dynamic bearing design comprising a shaft and a thrust plate at or near an end of the shaft, asymmetry is again established along the journal bearing to establish a pressure gradient directed toward the thrust bearing.

20 Claims, 6 Drawing Sheets

U.S. PATENT DOCUMENTS

| | | | |
|---|---|---|---|
| 5,947,608 A * | 9/1999 | Kim | 381/110 |
| 6,019,516 A | 2/2000 | Leuthold et al. | 384/110 |
| 6,181,039 B1 * | 1/2001 | Kennedy et al. | 310/90 |
| 6,211,592 B1 | 4/2001 | Ichiyama | 310/90 |
| 6,280,088 B1 | 8/2001 | Leuthold et al. | 384/110 |
| 6,322,252 B1 | 11/2001 | Grantz et al. | 384/124 |
| 6,371,650 B1 | 4/2002 | Goto et al. | 384/110 |
| 2003/0198413 A1 * | 10/2003 | Hoffman et al. | |

* cited by examiner

| Low Cost Single Cone/Journal Hydraulic Thrust Bearing Design | | | | | | | |
|---|---|---|---|---|---|---|---|
| | | Temperature | | | | | |
| Parameter | Units | OC | 25C | 70C | OC TC | 7OC TC | |
| Journal Gap | µm | 4.0 | 4.0 | 4.0 | 4.0 | 3.5 | |
| Journal Balanced Length | mm | 1.118 | 1.118 | 1.118 | 1.118 | 1.118 | |
| Journal Asymmentry Length | mm | 0.173 | 0.173 | 0.173 | 0.173 | 0.173 | |
| Journal Total Length | mm | 1.291 | 1.291 | 1.291 | 1.291 | 1.291 | |
| Conical Gap | µm | 5.0 | 5.0 | 5.0 | 5.0 | 5.0 | |
| DC Pressure | PSIG | 60.1 | 20.0 | 5.5 | 51.5 | 7.3 | |
| Thrust Load | N | 2.9 | 1.0 | 0.3 | 2.5 | 0.35 | |
| Axial Stiffness (KZZ) | lbf/in | 1376 | 457 | 126 | 1376 | 126 | |
| Radial Stiffness (KXX) | lbf/in | 10854 | 3608 | 992 | 9507 | 1278 | |
| Angular Stiffness (KMXX) | lbf-in/rad | 152 | 50 | 14 | 143 | 16 | |
| Angular Damping (WBMXX) | lbf-in/rad | 1180 | 392 | 108 | 1174 | 109 | |
| Power | W | 0.377 | 0.125 | 0.034 | 0.371 | 0.036 | |
| Op Vibe | Pass/Fail | Pass | Pass | Pass | Pass | Pass | |

FIG. 5A

HYDRAULIC FLUID DYNAMIC BEARING INCORPORATING AN ASYMMETRIC JOURNAL BEARING

CROSS REFERENCE TO A RELATED APPLICATION

This application claims priority to a provisional application Ser. No. 60/377,329, filed May 1, 2002, entitled Hydraulic FDB Motor for HDD Applications invented by Jeffry Arnold LeBlanc, Alan Lyndon Grantz, Troy Michael Herndon, Michael David Kennedy, Anthony Joseph Aiello and Robert Alan Nottingham and incorporated herein by reference.

FIELD OF THE INVENTION

The present invention relates to the field of fluid dynamic bearings, and more particularly to a fluid bearing incorporating an asymmetric journal bearing, to reduce cost and/or power requirements.

BACKGROUND OF THE INVENTION

Disc drive memory systems have been used in computers for many years for storage of digital information. Information is recorded on concentric tracks of a magnetic disc medium, the actual information being stored in the forward magnetic transitions within the medium. The discs themselves are rotatably mounted on a spindle, while the information is accessed by read/write has generally located on a pivoting arm which moves radially over the surface of the rotating disc. The read/write heads or transducers must be accurately aligned with the storage tracks on the disk to ensure proper reading and writing of information.

During operation, the discs are rotated at very high speeds within an enclosed housing using an electric motor generally located inside the hub or below the discs. Such known spindle motors typically have had a spindle mounted by two ball bearing systems to a motor shaft disposed in the center of the hub. The bearings are spaced apart, with one located near the top of the spindle and the other spaced a distance away. These bearings allow support of the spindle or hub about the shaft, and allow for a stable rotational relative movement between the shaft and the spindle or hub while maintaining accurate alignment of the spindle and shaft. The bearings themselves are normally lubricated by highly refined grease or oil.

The conventional ball bearing system described above is prone to several shortcomings. First is the problem of vibration generated by the balls rolling on the bearing raceways. This is one of the conditions that generally guarantee physical contact between raceways and balls, in spite of the lubrication provided by the bearing oil or grease. Hence, bearing balls running on the generally even and smooth, but microscopically uneven and rough raceways, transmit the rough surface structure as well as their imperfections in sphericity in the vibration of the rotating disc. This vibration results in misalignment between the data tracks and the read/write transducer. This source of vibration limits the data track density and the overall performance of the disc drive system. Vibration results in misalignment between the data tracks and the read/write transducer. Vibration also limits the data track density and the overall performance of the disc drive system.

Further, mechanical bearings are not always scalable to smaller dimensions. This is a significant drawback, since the tendency in the disc drive industry has been to continually shrink the physical dimensions of the disc drive unit.

As an alternative to conventional ball bearing spindle systems, much effort has been focused on developing a fluid dynamic bearing. In these types of systems lubricating fluid, either gas or liquid, functions as the actual bearing surface between a shaft and a sleeve or hub. Liquid lubricants comprising oil, more complex fluids, or other lubricants have been utilized in such fluid dynamic bearings. The reason for the popularity of the use of such fluids is the elimination of the vibrations caused by mechanical contact in a ball bearing system, and the ability to scale the fluid dynamic bearing to smaller and smaller sizes.

Many current fluid dynamic bearing designs are a combination of journal and thrust bearings. Frequently, these designs include a shaft journal bearing design having a thrust plate at an end thereof, or a dual conical bearing design, including a conical bearing at or close to either end of the shaft. The conical bearings typically include a grooved surface on each cone; the thrust plate bearings typically include two grooved surfaces, one facing each of the gaps defined by the thrust plate and sleeve, and by the thrust plate and counterplate. Because of these multiple grooved surfaces, it is difficult to make motors which are low in cost, and have low power requirements, because of the fact that each of the grooved surfaces, both at start-up and at steady state, require a power budget to start and maintain constant speed rotation.

SUMMARY OF THE INVENTION

The present invention intended to produce a fluid dynamic bearing assembly which is especially useful in a high speed spindle motor assembly.

More particularly, the present invention is intended to provide a fluid bearing assembly in which one aspect power consumption by the bearing assembly is reduced.

In another aspect of the invention, a fluid dynamic bearing assembly is proposed in which the cost of assembly of the motor is reduced.

These and other advantages and objectives are achieved by providing a design including a shaft having a journal bearing for providing radial support, and a conical or thrust plate or similar bearing at or near an end of the shaft.

A fluid bearing design is provided which according to one aspect includes a shaft defining together with a surrounding sleeve an asymmetric journal bearing, and a thrust bearing at or near an end of the shaft towards which the asymmetric journal bearing is pumping, with that end of the shaft being closed off. The journal bearing asymmetry establishes a hydraulic pressure toward the closed end of the shaft. This pressure provides an axial thrust to set the bearing gap for the conical bearing. The conical bearing itself is a relatively balanced bearing, although it may have a bias pumping toward the shaft and the journal bearing.

A pressure closed equalization path from the journal bearing through the conical bearing to the end of the shaft may be established to maintain a constant hydraulic force across the conical bearing, and which may also prevent any asymmetry in the conical bearing from affecting the net thrust force acting upon the end of the shaft where the conical bearing is located.

Alternatively, in a fluid dynamic bearing design comprising a shaft and a thrust plate at or near an end of the shaft, asymmetry is again established along the journal bearing to establish a pressure gradient directed toward the thrust bearing. In a preferred aspect of the invention, the gap between the thrust plate and the counterplate is made somewhat wider than normal. Journal bearing asymmetry establishes a hydraulic force to the bottom end of the shaft, distal from the location of the thrust plate. The pressure is intended to provide axial thrust against the end of the shaft where the thrust plate is mounted to establish and maintain the bearing gap for the thrust bearing. In a preferred aspect of the invention, a pressure equalization path from the thrust bearing toward the distal end of the shaft is established to help prevent asymmetry in the thrust bearing from affecting the net thrust force acting upon the end of the shaft adjacent the thrust bearing.

Other features and advantages of the invention will be apparent to a person of skill in the art who studies the disclosure. Of some preferred embodiments and aspects of the invention given with respect to the following figures.

DETAILED DESCRIPTION OF THE PREFERRED EMBODIMENTS

Reference will now be made in detail to exemplary embodiments of the invention, examples of which are illustrated in the accompanying drawings. While the invention will be described in conjunction with these embodiments, it is to be understood that the described embodiments are not intended to limit the invention solely and specifically to only those embodiments, or to use solely in the disc drive which is illustrated. On the contrary, the invention is intended to cover alternatives, modifications and equivalents which may be included within the spirit and scope of the invention as defined by the attached claims. Further, both hard disc drives, in which the present invention is especially useful, and spindle motors, where the invention is also especially useful are both well known to those of skill in this field. In order to avoid confusion while enabling those skilled in the art to practice the claimed invention, this specification omits such details with respect to known items.

Figure 1:
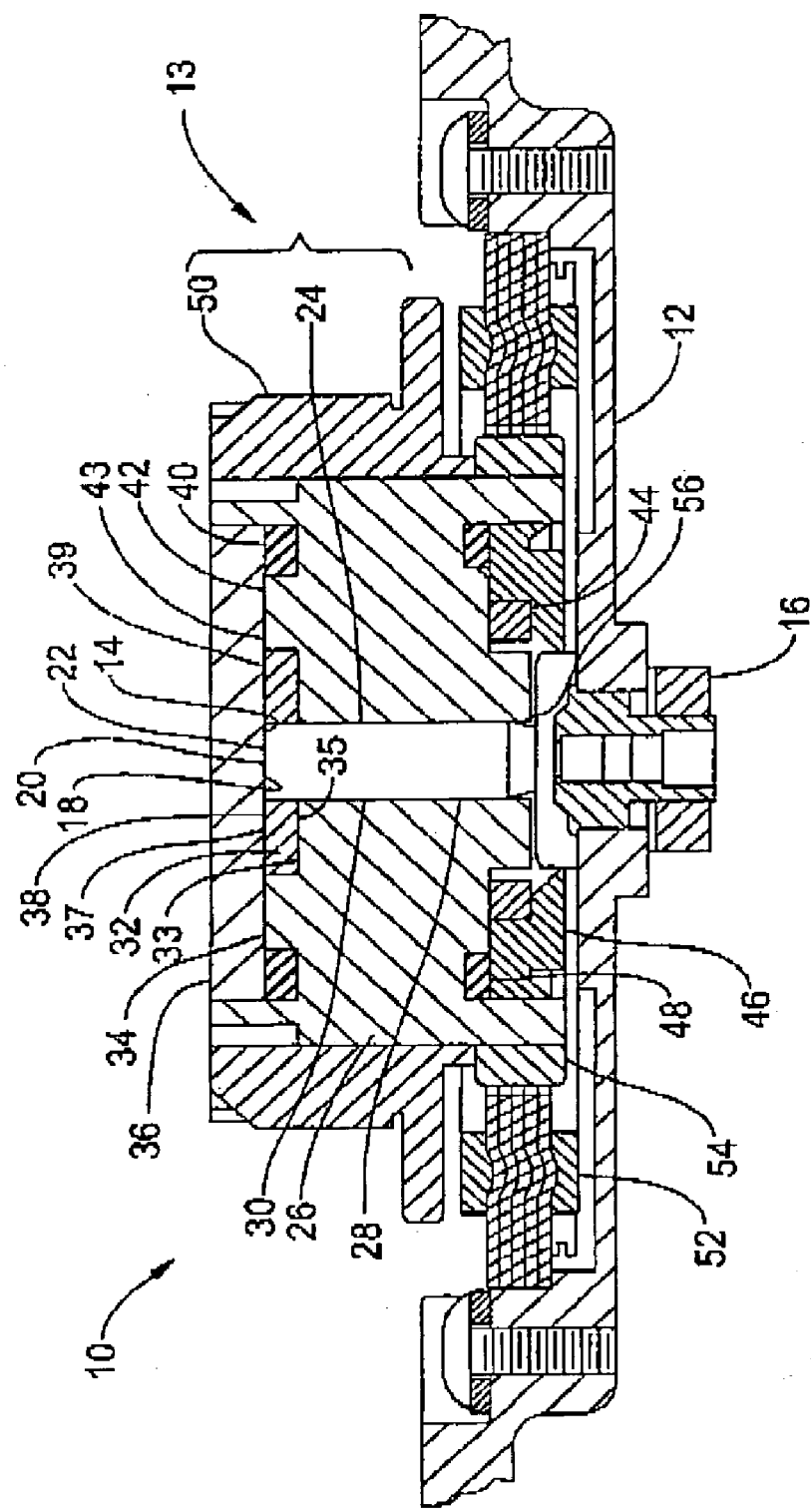
FIG. 1 is a vertical sectional view of a prior art fixed shaft spindle motor and portions of a disc drive.

FIG. 1 is a cross section through one embodiment of a spindle motor assembly which may readily be adapted to incorporate a fluid dynamic bearing arrangement according to the present invention. The spindle motor shown in FIG. 1 is of a fixed shaft design; whereas FIGS. 3 & 4 which are used to illustrate aspects of the present invention in a rotating shaft design and a fixed shaft design, respectively. It will be apparent to a person of skill in the art that the present invention is readily useful with both either a fixed shaft or a rotating shaft design.

FIG. 1 illustrates a cross section through one embodiment of a spindle motor which may be adapted to incorporate a fluid dynamic arrangement according to the invention. The spindle motor assembly comprises a base 12 and a hub assembly 13. A shaft 14 is mounted to the base 12 by a nut 16.

The outer surface of the shaft 14 and the adjacent bore of the journal sleeve 26 together form hydrodynamic journal bearings 28, 30. The dual reference numbers are used because the journal bearings are typically in two sections. The bearing gaps at the hydrodynamic journal bearings, 28, 30 are typically between 0.001 and 0.006 although other gap widths may be useful. The journal bearings 28, 30 each include a grooved surface. The grooved surfaces may be provided either on the outer surface of the shaft 14, or the inner bore surface of the journal sleeve 26.

A thrust plate 32 is press fitted or formed or otherwise attached to an end of the shaft 14 and extends transversely to the shaft 14. The thrust plate 32 is circular in form; the thrust plate 32 defines a first axial thrust surface 33 which, together with a facing sleeve thrust surface 35 extending transverse to the journal bearing defines a first fluid dynamic thrust bearing 34 in the gap between the two surfaces. As can be seen from FIG. 1, the disc thrust surface 35 at bearing 34 extends transversely to the journal at 30, and the thrust bearing gap is connected to that journal bore.

A counterplate 36 is press fitted to or otherwise supported by the journal sleeve 26 adjacent the thrust plate surface 37 which is distal from the journal bearing 28, 30. The counterplate 36 has a surface 39 which cooperates with the thrust plate surface 37 to define a gap in which fluid is maintained during rotational operation of the shaft and sleeve. Therefore, the counterplate 36 is sealed to the journal sleeve 26 by a O-ring 40 or similar means to prevent any loss of the fluid which appears in the gap between counterplate and thrust plate.

The hub assembly 13 is rotated with respect to the base 12 in use by means of an electromagnetic motor. The electromagnet motor comprises a stator assembly 52 mounted to the base 12, and a magnet 54 mounted to the journal sleeve 26.

As can be appreciated from FIG. 1, the hub assembly 13, which generally comprises the journal sleeve 26, hub sleeve 50, and counterplate 36, is supported for rotation relative to the base 12 and shaft 14 on hydrodynamic bearings 28, 30, 34, and 38.

Figure 2:
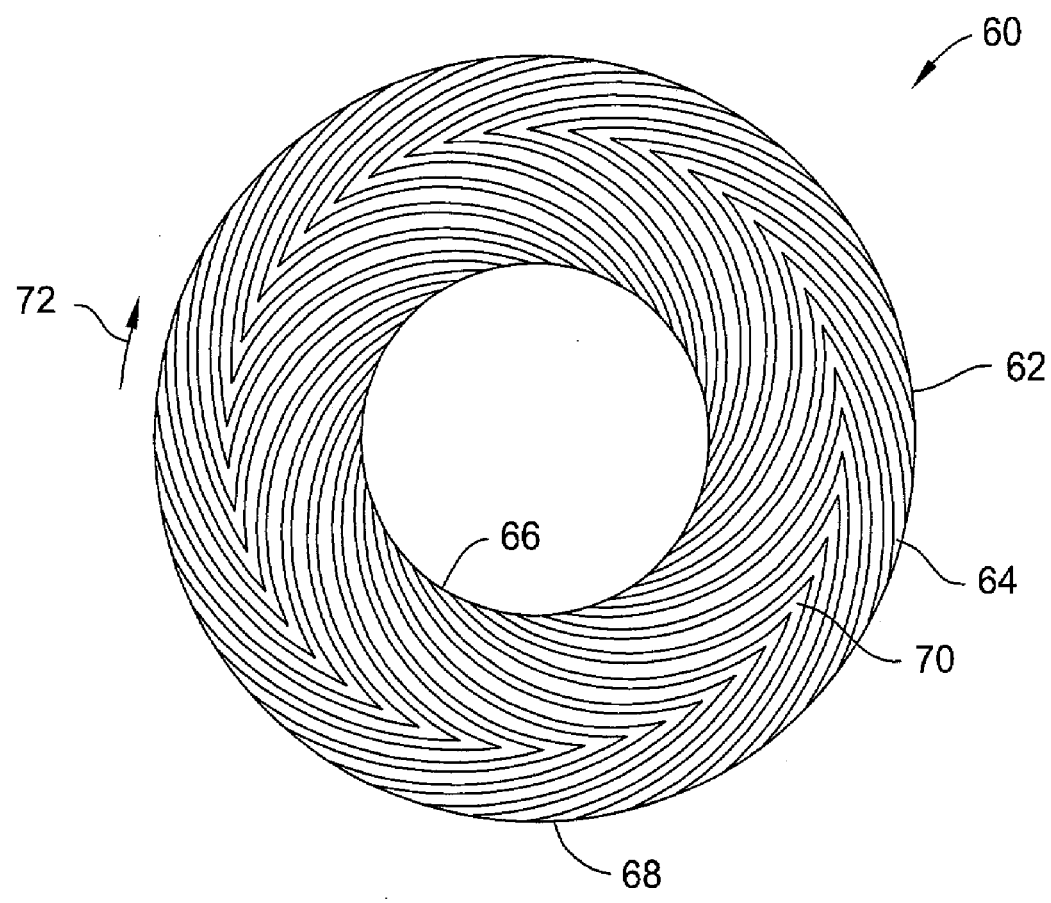
FIG. 2 is a plan view of a thrust plate of a fluid dynamic bearing.

The operation of a hydrodynamic bearing can best be understood by reference to FIG. 2, which illustrates a plan view of one of the surfaces of a hydrodynamic thrust bearing. The illustrated hydrodynamic bearing surface, generally indicated by the numeral 60, comprises a series of alternating grooves 62 and lands 64. Each groove 62 and lands 64 comprises a leg which extends outward from the inner radius 66 of the hydrodynamic bearing surface 60 and a leg which extends inward from the outer radius 68 of the hydrodynamic bearing surface 60. The two legs meet at a point at an intermediate radius 70. The plurality of grooves 62 and lands 64 together form a curved pattern as illustrated in the figure.

A hydrodynamic thrust bearing is formed when the bearing surface 60 is placed adjacent to an opposed bearing surface with a film of lubricant between the two surfaces. When the bearing surface 60 is rotated in the direction 72, that is against the herringbone pattern, the grooves 62 and lands 64 tend to draw lubricant from the inner and outer radii 66 and 68 towards the points of the pattern at 70. This creates a radial pressure distribution within the lubricant which serves to keep the bearing surfaces apart under external loading.

By varying the pattern of grooves 62 and the lands 64 in a known fashion, the pressure distribution across the hydrodynamic bearing can be varied. In particular, if the pressure in the bearing lubricant is greater at the inner radius 66 than at the outer radius 68 during operation, a new flow of lubricant from the inner radius 66 to the outer radius 68 will result, and vice versa. This can be done, for example, by having the intermediate radius 70, at which the points of the herringbone pattern are located, closer to the outer radius 68. Other ways in which the pressure distribution across the hydrodynamic bearing can be varied include altering the depth or width of the grooves, the number of grooves, or the angle the grooves make with a radial axis. The significance of having a net flow of lubricant across the bearing surface is discussed below.

The grooves 62 and lands 64 may be formed in the hydrodynamic bearing surface by any number of means including, for example, electroforming or stamping.

Although the operation of a hydrodynamic bearing has been discussed with reference to a hydrodynamic thrust bearing, it will be appreciated that the above principles can be applied to a hydrodynamic journal bearing such as the hydrodynamic journal bearings 28 and 30 illustrated in FIG. 1. In particular, the pattern of the grooves and lands of the hydrodynamic journal bearings 28, 30 can be arranged to create a net flow of lubricant in a direction along the longitudinal axis of the shaft 14, i.e. towards or away from the base 12; in this case it is toward the thrust bearing.

It will also be appreciated that a hydrodynamic bearing is not limited to the use of a particular pattern of grooves 62 and lands 64. For example, a spiral or sinusoidal pattern may be used as an alternative to the herringbone pattern.

Referring again to FIG. 1, in use the hub assembly 13 (generally comprising the journal sleeve 26, counterplate 36, and the hub sleeve 50) is rotated relative to the base 12 by means of an electromagnetic motor comprising stator assembly 52 and magnet 54. The hub assembly is supported for smooth rotation on the shaft 14 and thrust plate 32 by the pressures generated in the lubricant at the hydrodynamic bearings 28, 30, 34 and 38.

The embodiments of the present invention are intended to minimize power consumption and maintain stability of the rotating hub. The problem is complicated by the fact that the relative rotation of the hub sleeve shaft combinations is supported by fluid whose viscosity changes with temperature. Moreover, the power consumption also changes with the change in viscosity of the fluid. At low temperature the viscosity is high and the power consumption is also relatively high. The larger the grooved areas, the greater the power consumption. The power consumption and also stiffness change with the width of the gap in which the bearing is established. In the typical designs as exemplified in FIG. 1, the gap is constant, and therefore the power consumption and stiffness vary as the viscosity of the fluid changes.

The present design provides a fluid dynamic bearing in which a net hydraulic pressure is generated by a asymmetric journal bearing located on the shaft of the motor, establishing a thrust force toward a second bearing surface which is located off axis from the shaft. An advantage of this approach is that the need for accurate setting of axial play in the off-axis surface is diminished. The pressure created by asymmetric journal bearing exerts a positive thrust force on the end of the shaft which displaces the shaft axially, such that a second bearing surface located off-axis from the shaft moves against a counter bearing surface, thus creating a counter thrust force. Thus, the hydraulic force and the counter thrust force so established combine to form a thrust bearing. The present invention, is intended to simplify the design, reduce cost and/or power consumption which is typically associated with the use of thrust bearing and conical bearing designs; it also may reduce the overall height of the design. The fewer grooved surfaces that are created provide these beneficial results.

Figure 3:
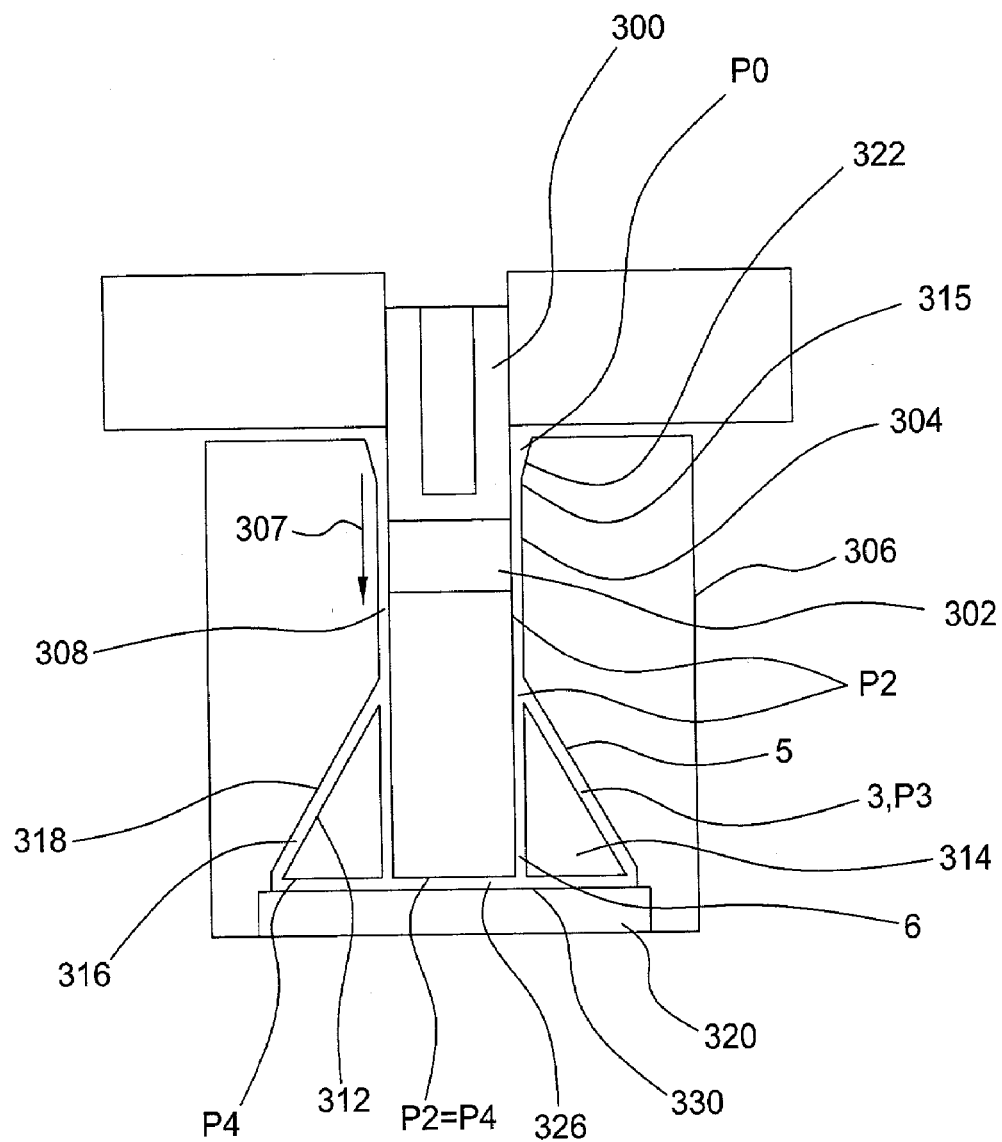
FIG. 3 is a vertical sectional view of a rotating shaft design of fluid dynamic bearing incorporating principles of this invention.

A first aspect of the present invention appears in FIG. 3. Referring to FIG. 3, it includes a rotating shaft 300 having a journal bearing 302 defined between an inner surface 304 of sleeve 306 and an outer surface 308 of shaft 300. The journal bearing 302 is generally indicated at 302. The bearings are often designed in accordance with known principles to establish an asymmetric pressure in the direction of the conical bearing which will comprise an off-axis surface defined gap for providing axial stability to the system.

This conical bearing comprises an outer surface 312 of cone 314, the inner surface 316 of sleeve 302 and the fluid in the gap 318 which is thereby to support relative rotation of the sleeve and the counterplate 320 that is supported over and around the shaft 300 and the cone 314. To establish the fluid pressure which supports the relative rotation of the sleeve 306 over the cone 314, one of the two surfaces of the non-axial (in this instance conical) bearing defined by surfaces 312 and 316 is grooved in accordance with known principles. Relative rotation of these two surfaces will build up pressure in the gap to keep the surfaces out of contact and allow for relative rotation. In operation, the asymmetric journal bearing 302 defined on the shaft 300 provides a net pressure P2 in the direction of the arrow 307 above ambient pressure P0 which exists at the capillary seal 322 that closes off the bottom of the gap 315 along which the journal bearing is defined. This pressure generally indicated by the arrow 307 provides a lifting force against the distal end 326 of the shaft 300, that is the end which is most distant from the capillary seal 322 and which is at or near the conical bearing. This lifting force raises the shaft 300 off the counterplate 320 and closes the conical gap 318 between the cone 314 and the sleeve 306. The net pressure P4 bearing against the bottom of the shaft will then substantially match the net pressure from the P2 from the journal bearing, and come to bear against the end 326 of the shaft, raising the shaft and supporting it above the facing surface 330 of counterplate 320.

Figure 4:
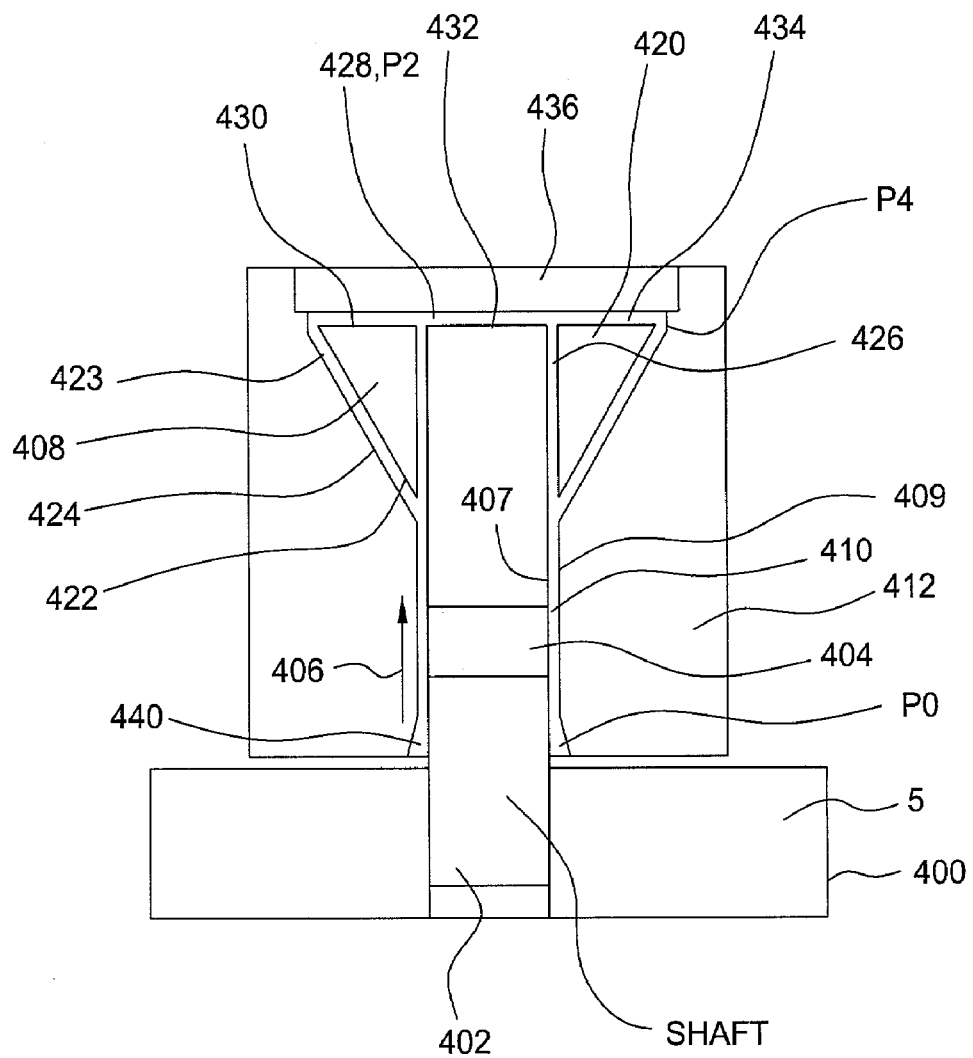
FIG. 4 is a vertical sectional view of a fixed shaft design of fluid dynamic bearing incorporating principles of this invention.

FIG. 4 comprises a fixed shaft design. More specifically, the embodiment includes a shaft 402 fixed to a base 400. A sleeve 412 is supported for rotation around the shaft 402 by the journal bearing 404 defined along a section of the shaft. As is well known in this technology, the journal bearing 404 is defined between the outer surface 407 of the shaft 402 and the inner surface 409 of the sleeve 412; the grooves which are necessary to establish the pressure which supports the relative rotation may be on either the outer surface 407 of the shaft 402 or the inner surface 409 of the sleeve 412.

In this particular approach, the journal bearing 404 creates an asymmetric pressure toward the conical bearing 408 which is at the distal end of the shaft from the base 400. The conical bearing 408 comprises an outer surface of a generally conical element on a shaft and a facing surface of the sleeve, with fluid in the gap supporting relative rotation. The design includes a cone 408 at or near the end of the shaft 402 distal from the base. This cone provides both axial and radial support for the sleeve rotating around the shaft by virtue of grooves provided on either the outer surface 422 of the cone or the inner surface 424 of the sleeve. An equalization path 426 is provided from the gap 428 which is defined between the axial surface 430 of the cone and the end surface 432 of the shaft 402 and the facing axial surface 434 of counter plate 436. According to the embodiment, grooves in this region are not necessary. Rather, the asymmetric pressure represented by the arrow 406 is created against the end of the shaft 432. At the end 432 of the shaft 402 so that as the sleeve rotates over the shaft, a lifting force is created which lifts the counter plate 436 away from the shaft end 432.

As with the previous embodiment, the objective is to establish by virtue of the asymmetric journal bearing 406 a net pressure P2 on the base 432 of the shaft 402 above ambient pressure P0 which would be measurable at or near the end of the gap which defines the journal bearing and ends in the capillary seal 440. This pressure provides a lifting force that raises that, as the sleeve rotates relative to the shaft under the impetus of the motor not shown in which this is typically incorporated which closes the conical bearing gap 423 between the sleeve surface 424 and the cone surface 422. The design objective which is intended to be met for optimum performance in that the net pressure P4 generated in the conical gap 423 will match the net pressure from the P2 journal bearing 404.

Figure 5B:
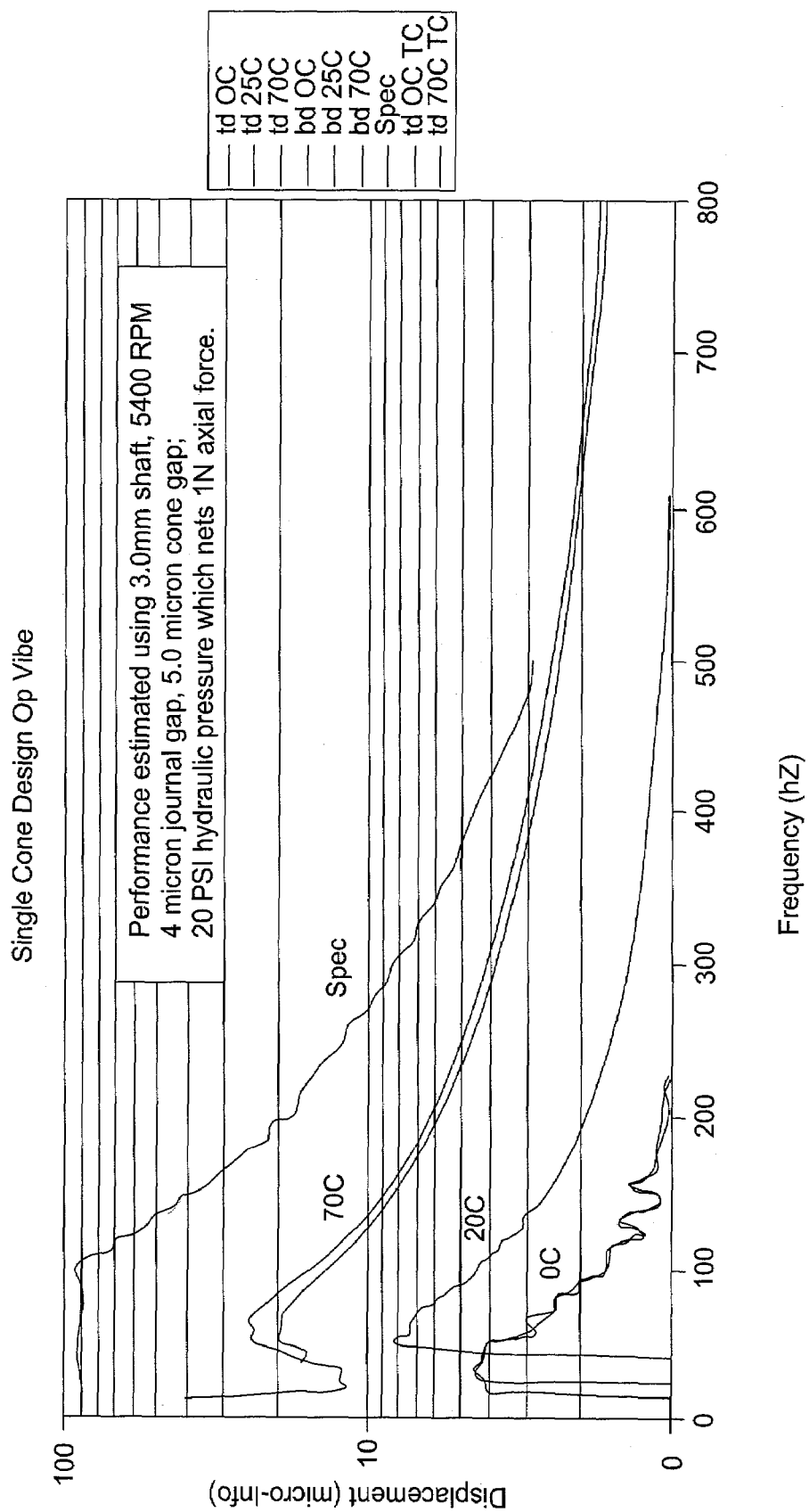
FIG. 5 is a graph demonstrating the performance of aspects of this invention.

FIG. 5 illustrates a model of the present design where bearing stiffness and power were modeled using Cadense software. The journal and conical bearings were optimized to minimize the net axial force while providing equal net pressure. This model, the net lifting force was set at one Newton at 25° C.; based upon a shaft diameter of 3.0 mm, a net 20 psi G was established at the bottom of the shaft, this model illustrates that there is sufficient lifting force to provide for reliable long-term operation. Other features and advantages of the invention will be apparent to a person of skill in the art who studies the disclosure. Therefore, the scope of the invention is to be limited only by the following claims.

What is claimed is:

1. A fluid dynamic bearing arrangement comprising a sleeve defining a bore,
    a shaft supported in the bore, the shaft and bore together defining an asymmetric fluid dynamic journal bearing which supports rotation of the shaft and the sleeve relative to one another,
    a second bearing including an off-axis surface supported near a first end of the shaft, a cooperating surface of the sleeve, pressure on fluid in a first gap between the off-axis surface and the sleeve surface establishing a thrust bearing to axially support the shafts,
    an ungrooved counterplate mounted to the journal sleeve and defining together with an axially directed surface of the thrust plate a second gap which is in fluid communication with the first thrust bearing and the fluid dynamic journal bearing.

2. A fluid dynamic bearing arrangement as claimed in claim 1 wherein the asymmetric journal bearing defined between the shaft and the sleeve establishes an axial pressure against the first end of the shaft.

3. A fluid dynamic bearing arrangement as claimed in claim 1 wherein the asymmetric journal bearing includes a grooved pattern on one of the journal sleeve or the shaft.

4. A fluid dynamic bearing arrangement as claimed in claim 2 wherein the grooved pattern on the off axis surface is a balanced groove pattern.

5. A fluid dynamic bearing arrangement according to claim 3 wherein the grooved surface is chosen from a group comprising a chevron pattern or an outward spiral.

6. A fluid dynamic bearing arrangement as claimed in claim 5 further comprising a circulation path extending from the second thrust bearing gap to the journal bearing gap.

7. A fluid dynamic bearing arrangement as claimed in claim 6 wherein the circulation path comprises a groove extending axially through conical element supporting the off-axis surface.

8. A fluid dynamic bearing arrangement as claimed in claim 2 wherein the journal bearing comprises first and second groove patterns along the gap between the shaft and the sleeve, the second section being more distant from the thrust plate than the first section and being modified relative to the first section to create the journal asymmetric pumping action toward the thrust plate along the shaft.

9. A fluid dynamic bearing arrangement as claimed in claim 2 wherein the journal bearing groove asymmetry pumping action is sufficient to create a journal asymmetry pressure against the second thrust plate surface toward an end of the shaft to support the distancing of the counterplate from the second thrust plate surface.

10. A fluid dynamic bearing, arrangement as claimed in claim 2 wherein the journal bearing creates asymmetry pumping pressure sufficient to act as a constant force to axially bias the spacing of the thrust plate relative to the sleeve thrust surface and counterplate surface such that the off-axis grooved surface gap with the sleeve surface moves until axial force equilibrium is achieved.

11. A fluid dynamic bearing arrangement as claimed in claim 8 wherein in operation the gap between the thrust plate second surface and the counterplate is larger than the gap between the off-axis surface and the sleeve surface.

12. A fluid dynamic bearing arrangement comprising a sleeve defining a bore,
    a shaft supported in the bore the shaft and bore together defining a journal bearing means for supporting rotation of the shaft and the sleeve relative to one another,
    a thrust element supported from the shaft and cooperating with the sleeve to define a fluid dynamic thrust bearing for axially and radially supporting relative rotation of the shaft and the sleeve, wherein the axial force generated by the asymmetric pressure of a fluid dynamic bearing acts on the distal end of the shaft to counterbalance said fluid dynamic bearing.

13. A fluid dynamic bearing arrangement as claimed in claim 12 wherein the fluid dynamic thrust bearing comprises an off-axis surface defined on the thrust element and a facing surface on the sleeve.

14. A fluid dynamic bearing arrangement as claimed in claim 13 wherein the journal bearing means comprises an asymmetric journal bearing defined between the shaft and the sleeve establishing an asymmetric pressure directed toward the thrust bearing.

15. A fluid dynamic bearing arrangement as claimed in claim 14 further comprising an ungrooved counterplate supported on the journal sleeve and defining together with the second axially directed surface of the thrust element a second gap which is in fluid communication with the thrust bearing and the fluid dynamic journal bearing.

16. A fluid dynamic bearing arrangement as claimed in claim 15 further comprising a circulation path extending from the second thrust bearing gap to the journal bearing gap.

17. A fluid dynamic bearing arrangement as claimed in claim 16 wherein the circulation path comprises a groove extending axially through the thrust element.

18. A disc drive comprising a housing, a spindle motor supported from the housing and supporting one or more discs for rotation, the spindle motor including a fluid dynamic bearing arrangement comprising a sleeve defining a bore, a shaft supported in the bore, the shaft and bore together defining a fluid dynamic journal bearing which supports rotation of the shaft and the sleeve relative to one another, a thrust element supported on the shaft and having first and second surfaces, the first thrust surface and the sleeve thrust surface being non-axial and defining together a first fluid dynamic thrust bearing, and an counterplate mounted on the journal sleeve and defining together with the second surface of the thrust plate a gap which is in fluid communication with the first thrust bearing and the fluid dynamic journal bearing.

19. A disc drive as claimed in claim 18 including an asymmetric journal bearing defined between the shaft and the sleeve establishing an asymmetric pressure directed toward the first thrust bearing and ending in a capillary seal.

20. A disc drive as claimed in claim 19 wherein the journal bearing groove asymmetry pumping action is sufficient to create a journal asymmetry pressure against the second thrust plate surface toward an end of to shaft to support the distancing of the counterplate from the second thrust plate surface.

* * * * *